United States Patent
Scholtz et al.

(10) Patent No.: US 7,684,900 B2
(45) Date of Patent: Mar. 23, 2010

(54) ADAPTIVE PROVISION OF PROTECTION FUNCTION SETTINGS OF ELECTRICAL MACHINES

(75) Inventors: Ernst Scholtz, Raleigh, NC (US); Stefan Thorburn, Vasteras (SE); Mohamed Y. Haj-Maharsi, Garner, NC (US)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 11/676,769

(22) Filed: Feb. 20, 2007

(65) Prior Publication Data
US 2008/0201020 A1    Aug. 21, 2008

(51) Int. Cl.
*G06F 19/00* (2006.01)

(52) U.S. Cl. ............... 700/286; 700/177; 318/808; 340/638

(58) Field of Classification Search ............... 700/286, 700/292, 291; 340/638, 635; 361/89, 85, 361/65; 318/801–802, 808
See application file for complete search history.

(56) References Cited

U.S. PATENT DOCUMENTS

| | | | | |
|---|---|---|---|---|
| 4,161,027 A | * | 7/1979 | Russell | 700/293 |
| 4,745,512 A | * | 5/1988 | Hampson | 361/36 |
| 5,057,962 A | * | 10/1991 | Alley et al. | 361/24 |
| 5,282,124 A | * | 1/1994 | Nakamura et al. | 363/36 |
| 5,592,393 A | * | 1/1997 | Yalla | 700/293 |
| 5,644,458 A | * | 7/1997 | Schoen et al. | 361/31 |
| 5,771,162 A | * | 6/1998 | Kwon | 363/56.11 |
| 6,055,477 A | * | 4/2000 | McBurney et al. | 701/207 |
| 6,385,002 B1 | * | 5/2002 | Suzuki | 360/92.1 |
| 6,434,715 B1 | * | 8/2002 | Andersen | 714/39 |
| 6,985,800 B2 | * | 1/2006 | Rehtanz et al. | 700/292 |
| 7,102,866 B2 | * | 9/2006 | Bo | 361/81 |
| 2003/0200038 A1 | * | 10/2003 | Schweitzer et al. | 702/65 |
| 2004/0130839 A1 | * | 7/2004 | Bo | 361/92 |
| 2005/0046584 A1 | * | 3/2005 | Breed | 340/825.72 |
| 2005/0270164 A1 | * | 12/2005 | McDonald et al. | 340/638 |
| 2007/0038396 A1 | * | 2/2007 | Zima et al. | 702/65 |
| 2007/0086134 A1 | * | 4/2007 | Zweigle et al. | 361/85 |

OTHER PUBLICATIONS

Working Group J6 of the Rotating Machiner Protection Subcommittee Power System Relaying Committe, Performance of Generator Protection During Major System Distrubance, Oct. 2004, IEEE transactions on Power Delevery vol. 19, No. 4, pp. 1650-1661.*

(Continued)

*Primary Examiner*—Kidest Bahta
(74) *Attorney, Agent, or Firm*—Driggs, Hogg, Daugherty & Del Zoppo Co., L.P.A.

(57) ABSTRACT

A protection setting determiner (118) adaptively updates settings of protection functions in memory of a protection device (106) that protects a machine (102) that provides power to a power system (104), wherein the settings are updated based at least in part upon sensed data acquired during operation of the machine (102). A physical parameter determiner (110) receives the sensed data, which includes three-phase voltage and three-phase current values at the terminals of the machine (102), and uses any suitable real-time or off-line parameter estimation technique (such as Kalman Filtering for an augmented state) to determine physical parameters of the machine (102) and the power system (104). The protection setting determiner (118) uses the physical parameters to update the protection settings.

23 Claims, 3 Drawing Sheets

OTHER PUBLICATIONS

Generator Protection for all your needs . . . , Cooper Power System, WWW. cooperpower.com, Sep. 1999.* http://www.mantaest.com/generatorprotection.htm5/24/08, Manta Test System.*

ABB, Numerical generator protection REG316*4, 1MRK502001-Ben, data sheet, Issued Feb. 2002, pp. 1-44.

Knyazkin, et al., On the Parameter Estimation and Modeling of Aggregate Power System Loads, IEEE Transactions on Power Systems, 2004, pp. 1-9, vol. 19, No. 2.

Scholtz et al., Observer-Based Monitors for Electromechanical Dynamics in Power Networks, 15th PSCC, Liege, Aug. 22-26, 2005; pp. 1-7, session 4, paper 1.

* cited by examiner

ADAPTIVE PROVISION OF PROTECTION FUNCTION SETTINGS OF ELECTRICAL MACHINES

BACKGROUND

The present application relates to the protection of electrical machines used in electrical power systems.

In power generation, transmission, and distribution systems, it is important that electrical devices operate with a high level of reliability even in the presence of unanticipated events. However, for some of these events it is desirable to protect a piece of equipment from being damaged and for these instances reliability of a power generation, transmission, and distribution system is sacrificed momentarily. For example, a generator may be tripped (and consequently be removed from service) due to various reasons, including faults internal to the generator and certain disturbances in a transmission and distribution network. When electrical devices in power generation, transmission, and distribution systems are switched out in order to protect these devices, at least a portion of the power system will not operate optimally.

To protect electrical devices in power generation, transmission, and distribution systems, protection devices, such as protection relays, are placed in communication with devices that are to be protected, such that voltage levels, current levels, etc. can be monitored and reacted to accordingly. More particularly, the electrical protection device is often programmed with one or more protection functions that enable the protection device to protect against particular faults, such as pole slipping, underimpedance, and other suitable faults. Parameters of the protection functions are typically set as a function of the electrical device that is to be protected, its immediate power-system surroundings, the past experiences of an operator that is setting the parameters, and the custom or practices of a given utility.

While use of protection devices has aided in reducing damage to electrical devices, several problems remain. For example, setting parameters of protection functions in protection devices is sometimes referred to as an inexact science, and parameters may be incorrectly set due to factors such as incomplete or incorrect information, inadvertence, or the like. Additionally, parameters that are initially correct may, over time, become incorrect as a result of aging of the electrical device, changes or refurbishment of electrical devices, or changes to the associated electrical power system. If parameters of a protection function are improperly set, more frequent or unwarranted tripping of an electrical device may occur. Further, if faults are not properly detected by a protection device, damage to an electrical device that is to be protected (or a portion of a transmission and distribution network) may occur.

SUMMARY

Aspects of the present application address these matters, and others.

According to an aspect, a method includes acquiring data indicative of operating conditions of a machine that is protected by a protection device, wherein the protection device includes one or more protection functions. The method additionally includes iteratively providing settings for the one or more protection functions to the protection device based at least in part upon physical parameters of the machine that are determined based at least in part upon the acquired data.

According to another aspect, an apparatus includes a physical parameter determiner that is adapted to repeatedly estimate physical parameters of at least one of a power system or a machine that provides power to the power system, and a protection setting determiner that outputs settings for one or more protection functions in a protection device that protects the machine, wherein the settings of the protection functions are based at least in part upon the estimated physical parameters.

According to yet another aspect, an apparatus comprises means for repeatedly determining physical parameters of one or more of a machine to be protected and a power system electrically coupled to the machine, and means for adaptively updating settings of one or more protection functions in protection device that protects the machine based at least in part upon the determined physical parameters.

Those skilled in the art will appreciate still other aspects of the present application upon reading and understanding the attached figures and description.

FIGURES

The present application is illustrated by way of example and not limitation in the figures of the accompanying drawings, in which like references indicate similar elements and in which.

DESCRIPTION

Figure 1:
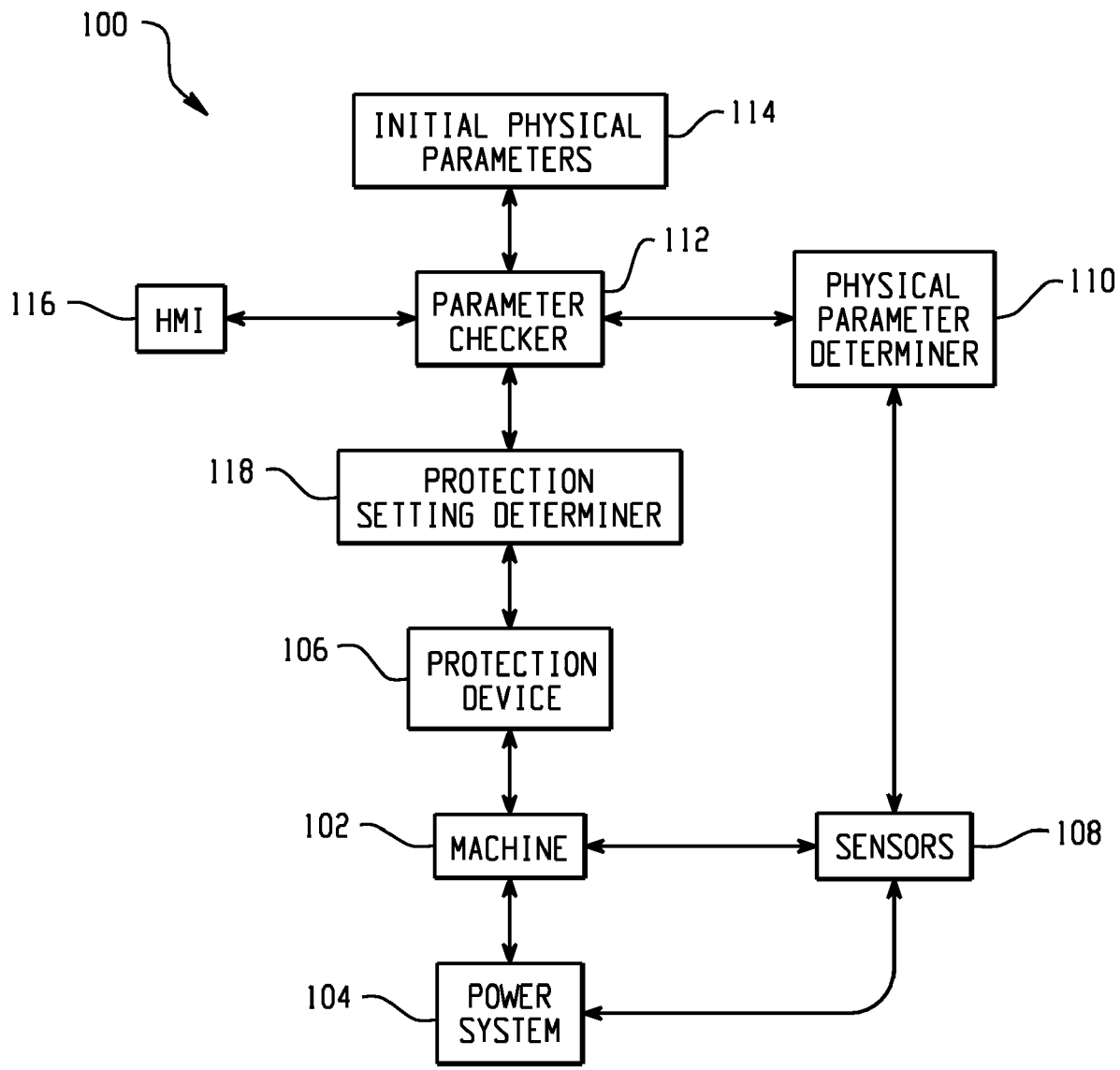
FIG. 1 depicts a system that facilitates adaptively updating settings of one or more protection functions.

With reference to FIG. 1, an apparatus 100 that facilitates adaptively setting parameters of protection functions is illustrated. The apparatus 100 includes a machine 102, such as a generator, connected to a power system 104 through a transformer, etc. A protection device 106, such as an intelligent electrical device (IED), protection relay, or the like protects the machine 102 during disturbances or faults through use of one or more protection functions. In an example, the protection device 106 is configurable and includes a memory for storing desired protection function settings. Examples of protection functions include inverse time overcurrent, thermal overload, stator overload, rotor overload, high impedance, undervoltage, overexcitation, amongst others.

Sensors 108 are configured to monitor operating conditions of the machine 102 and/or the power system 104. For instance, the sensors 108 can measure three phase voltage and current or other relevant operating conditions at the terminals of the machine 102. A physical parameter determiner 110 acquires data generated by the sensors 108 and, based at least in part thereon, determines physical parameters of the machine 102 and/or the power system 104, such as one or more of electrical, mechanical, or other parameters. The physical parameter determiner 110 may be configured to determine physical parameters from time to time, during fault conditions, while the machine 102 is online, while the machine 102 is offline, etc.

A parameter checker 112 receives physical parameters ascertained by the physical parameter determiner 110 and performs a statistical (or other) analysis thereon to ensure that the physical parameters are within a reasonable range. The parameter checker 112 also receives and analyzes initial physical parameters 114 that, as described in detail below, are determined through user input, static data, or a combination thereof.

An HMI 116 may be included to present physical parameters, determined by the physical parameter determiner 110, to a user together with analysis of the physical parameters undertaken by the parameter checker 112. For example, the HMI 116 may present a message that illustrates a discrepancy between physical parameters determined by the physical parameter determiner 110 and typical physical parameters for the machine 102 and/or the power system 104. A user may then indicate whether they accept or reject the physical parameters.

A protection setting determiner 118 uses initial physical parameters 114 relevant to the machine 102 and its connection to the rest of the power system 104, and/or physical parameters determined by the physical parameter determiner 110 to establish and output settings for operator-selected protection functions. More particularly, settings of protection functions can be based upon physical parameters of the machine 102 and/or power system 104, which are, from time to time, estimated by the physical parameter determiner 110. Thus, settings of the protection functions in the protection device 106 can be updated over time based upon output of the protection setting determiner 118, thereby tending to reduce nuisance trips and/or damage to equipment that may result from obsolete protection function settings. The updated settings are in turn communicated to the protective device 106 (e.g., after an operator has instructed to update the protection settings).

Figure 2:
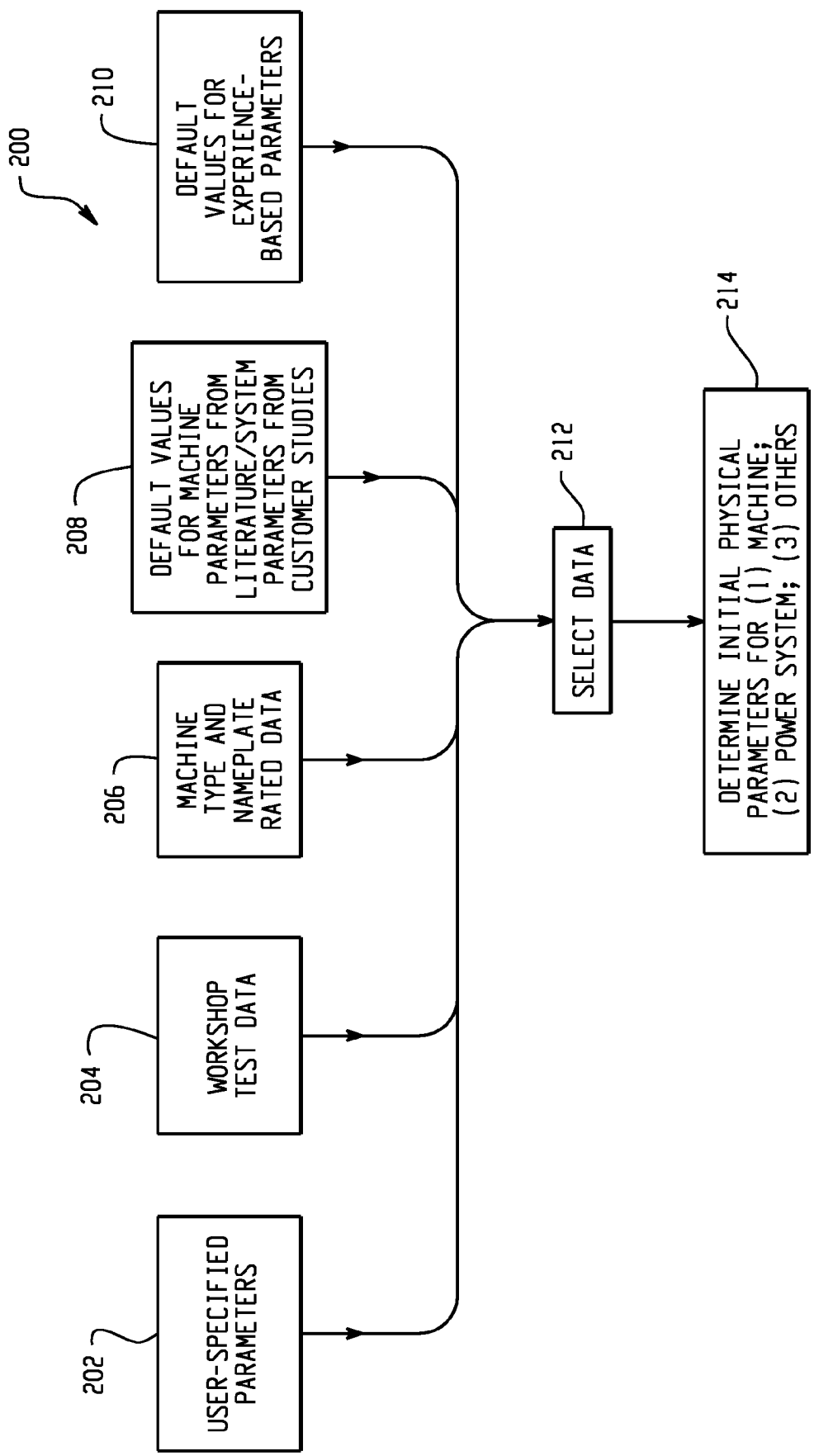
FIG. 2 depicts a functional block diagram that is used to describe initially providing settings of one or more protection functions.

Referring collectively to FIGS. 1 and 2, a functional block diagram 200 illustrating a manner in which the initial physical parameters 114 may be ascertained is illustrated. One or more sources of data may be available in connection with initially determining the physical parameters 114, which may be electrical, thermal, or mechanical parameters of the machine 102 and/or the power system 104. More particularly, user-specified data 202, workshop test data 204, machine type and nameplate rated data 206, default values for machine parameters from literature/default values for system parameters from customer studies 208, default values for experience-based parameters 210, or some suitable combination thereof are used to estimate the initial physical parameters 114. These sources of data 202-210 may be maintained in a centralized data repository or distributed across several data repositories.

With more detail regarding the user-specified parameters 202, an operator can explicitly provide one or more of such parameters. For example, through past experience with a generator and knowledge of a power system, the operator can indicate values for physical parameters of the generator and the power system. In the case of a generator, example parameters may include one or more of the transient reactances of the machine 102 e.g., ($X'_d$), impedance of the power system 104 ($Z_{sys}$) (an aggregation of impedances of portions of the power system 104), reactance of a step-up transformer electrically coupled to the machine 102 ($X_T$), one or more of the synchronous reactances of the machine 102 e.g., ($X_d$), sub-transient reactance of the machine 102 ($X_{d''}$), amongst others. In an example, in the context of protecting the machine 102 with respect to pole slipping, the operator can also input parameters that are functions of one or more of the aforementioned parameters, such as forward impedance, reverse impedance, impedance of a zone limit, etc.

If the operator is unaware of all physical parameters needed to properly set a particular protection function, the workshop test data 204, machine type and nameplate rated data 206, default values from literature and/or customer studies 208, and/or default values for experience-based parameters 210 can be used to obtain (or determine where applicable) the initial physical parameters 114. In an example, the workshop test data 204 may be test data that is acquired through standardized test procedures, such as detailed in the IEEE Standard 115, where electrical and thermal parameters of the machine 102 are computed from open circuit tests, short circuit tests, and the like. These electrical and thermal parameters can be used to determine one or more of the physical parameters described above.

The machine type and nameplate rated data 206 may include disturbance records and other data relating to operation of the machine 102 as well as information relating to the power system 104, such as devices used therein, location of lines and line material, etc. The machine type and nameplate rated data 206 can be used together with or in the absence of one or more of the workshop test data 204 and the user-specified parameters 202 to initially determine at least one physical parameter of the machine 102 and/or the power system 104.

The default values 208 may include information specific to the machine 102 to be protected, wherein such information can accord to how the machine 102 is wound, how many poles the machine 102 has, the rating of the machine 102, and the like. The default values 208 can also include data indicative of structure of the power system 104, such as a network model or an aggregate representation thereof. The default values 208 may be used in combination with one or more of the user-specified parameters 202, the workshop test data 204, and machine type and nameplate rated data 206 to initially determine physical parameters used to set protection functions in the protection device 106

The default values for experience-based parameters 210 include time-delay related information, such as delay time between when a fault is detected by the protection device 106 and when action (such as in the form of a trip signal sent to a breaker) is undertaken by the protection device 106. The default values 210 may be used alone or in combination with one or more of the user-specified parameters 202, the workshop test data 204, the machine type and nameplate rated data 206, and the default values 208 to initially determine the aforementioned physical parameters.

At 212, data from the data sources 202-210 is selected. For instance, data from certain sources can be given priority over data from other sources. Additionally, data from one or more sources can be selected to fill "holes" in data from another source. At 214, initial physical parameters are determined for the machine 102, the power system 104, and/or other entities that may be useful when setting parameters of protection functions in the protection device 106. Note that some or all of the data selection may be performed by a user or operator, by the physical parameter determiner 110, by the parameter checker 112, by the protection setting determiner 118, or otherwise.

Referring again to FIG. 1, operation of the apparatus 100 is described. The parameter checker 112 receives the initial physical parameters 114, which are ascertained as described infra. The parameter checker 112 analyzes the initial physical parameters 114 such that they can be compared with typical physical parameters. In an example, the initial physical parameters 114 may be based upon information provided by a user, and other data sources (e.g., data sources 204-206) may be used to ensure that the information provided by the user is reasonable. More particularly, a statistical analysis can be performed with respect to the data sources 204-206, and statistics subsequently obtained can be analyzed together with the information provided by the user. In the absence of describing parameters, a subset of the describing statistics can be obtained from the literature sources/customer studies 208. Such analysis can protect against human error; for instance, an operator may misplace a decimal point with respect to a particular physical parameter. The parameter checker 112 may inform the operator by way of the HMI 116 that a value for one or more physical parameters lies outside an expected range, and request confirmation from the operator. Additionally or alternatively, the parameter checker 112 may present a value determined by way of statistical analysis together with an estimated value (or value entered by an operator) to the operator by way of the HMI 116. The operator may confirm or deny the values for the initial physical parameters 114 presented by the HMI 116. It is to be understood, however, that in some instances it may be desirable to forego operator intervention.

The protection setting determiner 118 receives the initial physical parameters 114 and sets protection functions in memory of the protection device 106 based at least in part upon the initial physical parameters 114. With more specificity, the protection setting determiner 118 uses the initial physical parameters 114 to compute settings for one or more protection functions in the protection device 106. In an example, the protection device 106 may include a pole slipping protection function, and values for reactance of a step-up transformer and impedance of the power system 106 can be amongst the initial physical parameters 114. Based upon such values, the protection setting determiner 118 can determine a forward impedance based at least in part upon the values. The value for forward impedance, which is used by the protection device 106 to determine when pole slipping occurs, can be set as a parameter of the pole slipping protection function by the protection setting determiner 118.

The protection device 106 may then be commissioned with the protection functions that are set in accordance with the initial physical parameters 114, such that the protection device 106 reacts to faults with respect to the machine 102 and/or the power system 104.

As can be discerned from the above, settings of protection functions in the protection device 106 may be retained in memory of the protection device at commissioning thereof. As time progresses, however, the initial settings may become obsolete. For instance, the machine 102 may be refurbished or the power system 104 may be subject to change, possibly causing the protection function to operate improperly. Accordingly, the apparatus 100 is configured to adaptively update settings of protection functions over time as the machine 102 and/or the power system 104 is subject to change (e.g., refurbishment, degradation, redesign, . . . ). Sensors 108 can be used to monitor operating conditions of the machine 102 and/or the power system 104, and data generated by the sensors 108 is provided to the physical parameter determiner 110. For example, the machine 102 may be a synchronous generator, and the sensors 108 can monitor three-phase voltages and currents at terminals of the generator.

With more particularity, a suitable model of the machine 102, a model of the power system 104, and measurements acquired by the sensors 108 can be used by the physical parameter determiner 110 in connection with estimating one or more physical parameters (e.g., $X_d$, $X'_d$, $X''_d$, $X_T$, $Z_{sys}$, . . . ). For instance, through the use of at least the three phase voltage and current values at terminals of the machine 102, the physical parameter determiner 110 may use any suitable on-line or off-line parameter estimation scheme to estimate at least a subset of the physical parameters of the machine, such as the $X_d$, $X'_d$, and $X''_d$ of the machine 102, and $X_T$ and $Z_{sys}$ of the system 104. A suitable candidate can be Kalman Filtering of an augmented state vector where the uncertain parameters to be estimated in the model of the machine are appended to the state vector of the machine.

The physical parameters ascertained by the physical parameter determiner 110 may have been acquired by the parameter checker 112, which operates as described above. The protection setting determiner 118 uses the physical parameters determined by the physical parameter determiner 110 to update settings of one or more protection functions in memory of the protection device 106. Thus, settings of protection functions are adaptively updated based upon data sensed during operation of the machine 102 and/or in connection with a fault condition.

While shown as being separate from the protection device 106, it is to be understood that functions associated with one or more of the described modules can be retained in memory of the protection device 106. For example, the protection device 106 may include a sensing system, functionality of the physical parameter determiner 110, and functionality of the protection setting determiner 118. Additionally, while the HMI 116 is illustrated as being in communication with the parameter checker 112, it is to be understood that the HMI 116 can be in communication with other modules described herein. Moreover, the apparatus 100 may be in a standalone computer.

Furthermore, it is to be understood that the modules shown and described herein can be hardware, software, or a combination thereof. For instance, the modules may be computer programs retained within memory of a device which are executable by a processor with access to the memory. Additionally, as utilized in the claims, the term apparatus is intended to encompass several computing devices that perform distributed computing with respect to a single process (e.g., functions of the physical parameter determiner 110) as well as a single computing device that executes a process.

Figure 3:
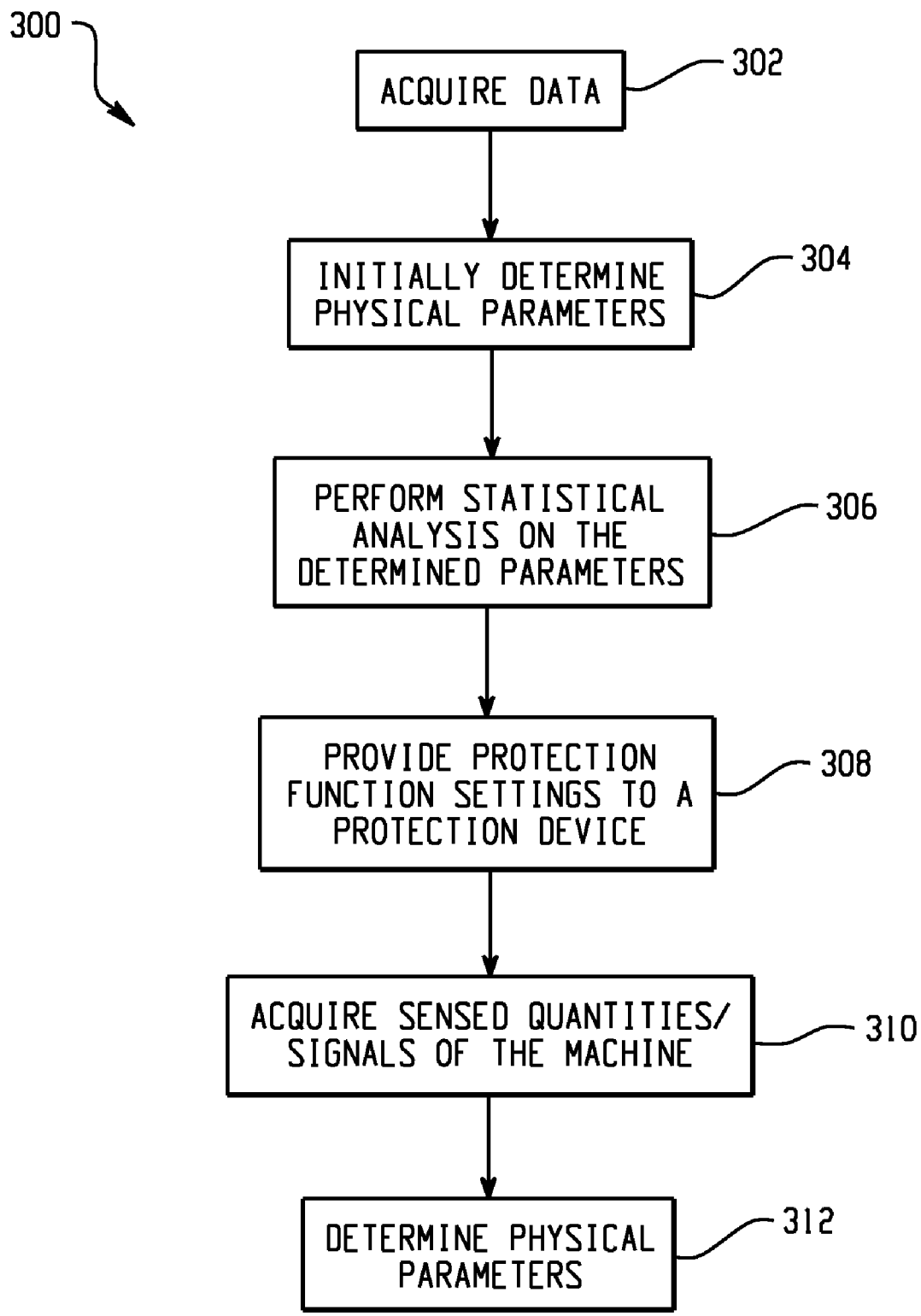
FIG. 3 depicts a method for automatically updating settings of protection functions.

Referring now to FIG. 3, a methodology 300 for automatically updating settings of one or more protections functions in a protection device is illustrated. While for purposes of simplicity of explanation the methodology 300 is shown and described as a series of acts, it is understood and appreciated that the claimed subject matter is not to be limited by the order of execution of the acts, as some acts may occur in a different order or concurrently with other acts from that shown and described herein. Moreover, not all illustrated acts may be required to implement a methodology in accordance with the hereto-appended claims.

At 302, data is acquired, wherein the data may include one or more of experience-based data from an operator or multiple operators with respect to a machine to be protected, workshop test data with respect to the machine to be protected, operational data with respect to the machine to be protected, and data from literature in relation to a type of the machine to be protected. At 304, initial physical parameters are determined based at least in part upon the acquired data, wherein the parameters may include one or more of $X_d$, $X'_d$, $X''_d$, and $Z_{sys}$.

At 306, an analysis is performed on the determined parameters to ensure that received information is in the realm of reason (e.g., within an acceptable range). For example, a statistical analysis can be performed with respect to various data sources, and statistics obtained therefrom can be analyzed together with the received information. In the absence of describing parameters, a subset of the describing statistics can be obtained from literature sources. For example, data acquired at 302 may include data input by an operator. The statistical analysis can help ensure that the operator did not enter incorrect parameters. Additionally, while not shown, the statistical analysis and physical parameters may be presented to an operator by way of an HMI for confirmation or review. If the operator confirms that the physical parameters are acceptable, at 308 protection function settings are provided to memory of the protection device that protects the aforementioned machine, wherein the protection function settings are based at least in part upon the physical parameters. At 310, sensed quantities/signals of the machine are acquired, such as three-phase voltage and current values at the terminals of the machine (which may be a portion of the disturbance information used by the physical parameter determiner 110, for example). At 312, the physical parameters are determined based at least in part upon the sensed operational data. The method 300 then returns to 306. Thus, protection function settings can be adaptively updated over time as physical parameters of a machine and/or power system change.

Of course, modifications and alterations will occur to others upon reading and understanding the preceding description. It is intended that the invention be construed as including all such modifications and alterations insofar as they come within the scope of the appended claims or the equivalents thereof.

What is claimed is:

1. A computer-implemented method, which, when executed by a computer, causes a processor of the computer to perform the following computer-executable acts:
    acquiring data indicative of operating conditions of a generator that is protected by a protection device, wherein the protection device includes one or more protection functions;
    iteratively providing settings for the one or more protection functions to the protection device based at least in part upon physical parameters of the generator that are determined based at least in part upon the acquired data; and
    protecting, via the protection device, the generator using the one or more protection functions with the iteratively provided settings.

2. The method of claim 1, further comprising:
    using parameter estimation techniques to determine at least one of inertia of the generator, shaft damping coefficient of the generator, or time-varying mechanical power input into the generator based at least in part upon the acquired data; and
    determining the physical parameters based at least in part upon the at least one of inertia of the generator, shaft damping coefficient of the generator, or time varying mechanical power input into the generator.

3. The method of claim 1, wherein the physical parameters of the generator include at least one of transient reactance of the generator, reactance of a step-up transformer electrically coupled to the generator, synchronous reactance of the electrical device, or sub-transient reactance of the generator.

4. The method of claim 1, further comprising performing a statistical analysis on the determined physical parameters, wherein the statistical analysis is based at least in part upon one or more of operator experience, workshop data, or physical parameters for a type of equipment reported in literature.

5. The method of claim 1, further comprising presenting the determined physical parameters to an operator for approval prior to providing the determined physical parameters to the protection device.

6. The method of claim 1, further comprising initially providing settings for the one or more protection functions.

7. The method of claim 6, wherein initially providing the settings comprises at least one of receiving operator input with respect to the physical parameters or acquiring workshop data.

8. The method of claim 1, wherein the data is acquired upon the generator experiencing a fault.

9. The method of claim 1, wherein the protection device is a protection relay.

10. The method of claim 1, wherein the acquired data includes three-phase voltages and three-phase currents at the terminals of the generator, and further wherein the physical parameters are determined as a function of the three-phase voltages and the three-phase currents.

11. The method of claim 1, wherein the physical parameters are determined through use of a combination of Least Squares techniques and Kalman Filters with respect to the acquired data.

12. An apparatus, comprising:
    at least one processor that repeatedly estimates physical parameters of a generator that provides power to a power system and that configures settings for one or more protection functions in a protection device that protects the generator, wherein the settings of the protection functions are based at least in part upon the estimated physical parameters, and the protection device employs the one or more protection functions, using the processor configured settings, to protect the generator.

13. The apparatus of claim 12 being the protection device.

14. The apparatus of claim 12, wherein the protection device is a protection relay.

15. The apparatus of claim 12, further comprising a parameter checker that performs a statistical analysis on estimated physical parameters.

16. The apparatus of claim 12, further comprising a human-machine interface that presents the physical parameters to an operator and receives operator instructions to update settings of protection functions in memory of the protection device through use of the estimated physical parameters.

17. The apparatus of claim 12, wherein the processor initially provides settings for the protection functions to the protection device by acquiring one or more of instructions from an operator, workshop data, operational data, or literature sources from a data repository.

18. The apparatus of claim 12, wherein the physical parameters include at least one of transient reactance of the generator, reactance of a step-up transformer electrically coupled to the generator, or synchronous reactance of the generator.

19. The apparatus of claim 12, further comprising sensors that acquire three phase voltage and three phase current values with respect to terminals of the machine, wherein the three phase voltage and three phase current values are used by the processor to estimate the physical parameters.

20. The apparatus of claim 12, wherein the processor estimates the physical parameters while the generator is online.

21. A method, comprising:
    acquiring, via a processor, data indicative of operating conditions of a generator, wherein the generator provides power to a power system, and the generator is protected by a protection device that includes one or more protection functions;
    iteratively both determining, via the processor, settings for the one or more protection functions of the protection device and providing, via the processor, the determined settings to the protection device, wherein the settings are determined based at least in part upon physical parameters of the generator that are determined based at least in part upon the acquired data; and using, via the protection device, the iteratively provided settings with the one or more protection functions to protect the generator.

22. The method of claim 21, further comprising:

using parameter estimation techniques to determine at least one of inertia of the generator, shaft damping coefficient of the generator, or time-varying mechanical power input into the generator based at least in part upon the acquired data; and determining the physical parameters based at least in part upon the at least one of inertia of the generator, shaft damping coefficient of the generator, or time varying mechanical power input into the generator, wherein the physical parameters of the generator include at least one of transient reactance of the generator, reactance of a step-up transformer electrically coupled to the generator, synchronous reactance of the generator, or sub-transient reactance of the generator.

23. The method of claim 22, further comprising presenting the determined physical parameters to an operator for approval prior to providing the determined physical parameters to the protection device.

* * * * *